US012061539B2

United States Patent
Bitla

(10) Patent No.: US 12,061,539 B2
(45) Date of Patent: Aug. 13, 2024

(54) SYSTEM AND METHOD FOR ANOMALY DETECTION AND ROOT CAUSE AUTOMATION USING SHRUNK DYNAMIC CALL GRAPHS

(71) Applicant: Srinivas Bitla, Hyderabad (IN)

(72) Inventor: Srinivas Bitla, Hyderabad (IN)

( * ) Notice: Subject to any disclaimer, the term of this patent is extended or adjusted under 35 U.S.C. 154(b) by 85 days.

(21) Appl. No.: 17/780,478

(22) PCT Filed: Nov. 26, 2020

(86) PCT No.: PCT/IN2020/050981
§ 371 (c)(1),
(2) Date: May 26, 2022

(87) PCT Pub. No.: WO2021/106014
PCT Pub. Date: Jun. 3, 2021

(65) Prior Publication Data
US 2023/0004487 A1    Jan. 5, 2023

(30) Foreign Application Priority Data

Nov. 28, 2019  (IN) .............................. 201941048954

(51) Int. Cl.
*G06F 11/00*    (2006.01)
*G06F 11/36*    (2006.01)

(52) U.S. Cl.
CPC ...... *G06F 11/3692* (2013.01); *G06F 11/3644* (2013.01)

(58) Field of Classification Search
CPC ............. G06F 11/3692; G06F 11/3644; G06F 11/079; G06F 11/302; G06F 11/362
See application file for complete search history.

(56) References Cited

U.S. PATENT DOCUMENTS

| | | | |
|---|---|---|---|
| 6,049,666 A * | 4/2000 | Bennett ................. | G06F 11/323 714/E11.181 |
| 11,580,222 B2 * | 2/2023 | Parlak ...................... | G06N 3/04 |
| 2019/0121979 A1 * | 4/2019 | Chari ...................... | G06F 8/433 |
| 2021/0406671 A1 * | 12/2021 | Gasthaus ................ | G06F 40/20 |
| 2022/0058073 A1 * | 2/2022 | Poghosyan ........... | G06F 11/079 |

* cited by examiner

Primary Examiner — Joseph D Manoskey

(57) ABSTRACT

A system and method for real-time or near real-time anomaly detection and root cause automation in production environments or in other environments using shrunk dynamic call graphs are provided. The system includes an instrumentation agent that generates shrunk dynamic call graphs and exceptions/errors by injecting monitoring code or probes or call-tags into monitored application, a data agent that forwards collected data to the analysis engine over a network, an analysis engine that performs continuous clustering using machine learning, anomaly, and root cause detection. The system also includes a reporting module to report the anomaly.

16 Claims, 16 Drawing Sheets

SYSTEM AND METHOD FOR ANOMALY DETECTION AND ROOT CAUSE AUTOMATION USING SHRUNK DYNAMIC CALL GRAPHS

TECHNICAL FIELD

The embodiments herein generally relate to the detection of anomalies, more particularly, a system and method for automatically identifying anomalies and analyzing root cause in software applications and programs to reduce Mean Time To Repair (MTTR) the anomalies.

DESCRIPTION OF THE RELATED ART

Nowadays everything is digitalized, identifying and troubleshooting of defects or bugs and applying code fixes is one of the important tasks in software engineering to maintain good quality of software service. Hence, lots of research work is undergoing to maintain the quality of software service at the highest levels. Engineers are spending their quality time pouring through tons of log files, trying to reproduce the defect or failure in development environments as they troubleshoot to find the root cause. Mean Time To Repair (MTTR) indicates the average amount of time required to repair a defect and companies strive hard to keep MTTR as low as possible. With currently available tools, this troubleshooting is still a manual task, which needs an engineer's experience, skill and time to analyze the problem to identify the root cause. This may take several days to several weeks which in turn causing MTTR to shoot high.

Since call graphs are an essential starting point for all inter-procedural analyses, many tools and frameworks such as instrumentation agents have been developed to generate the call graphs of a computer program. A call graph is a control flow graph, which represents calling relationships between subroutines in the computer program. Each node represents a method/procedure/function/subroutine and each edge (f, g) indicates that the method "f" calls method "g". The call graph basically shows the calling relationships between the program's methods. The call graphs may be dynamic or static. A dynamic call graph is a record of an execution of the program, for example as output by a profiler. The dynamic call graph can be exact, but only describes one run of the program or request. A static call graph is a call graph intended to represent every possible run of the program.

The dynamic call graphs have meaning and extracting such meaning will help in the detection of anomalies in program execution. As mentioned earlier, the dynamic call graphs are very detailed representations of one execution of the program. Generating such detailed graphs is very expensive operations in terms of time and memory. There will be approximately 1 to 20 million method entry or exits in one run of an average complex program or request and recording such a huge number of method calls takes huge amounts of memory and CPU cycles. Hence generating dynamic call graphs in production environments, where faster response times are not just important but demanded, is prohibitive. However, despite their prohibitive nature in production environments, because of the fact that there is meaning in dynamic call graphs and to extract such meaning, advanced methods are needed.

Existing approaches to detect anomalies are dependent on manual interpretation. Further, existing approaches are detecting anomalies by considering metrics like response times, error rate, memory usage, CPU usage, business transaction load.

Accordingly, there is a need for an efficient system and method for automatically identifying anomalies and root cause in real-time production applications to reduce Mean Time To Repair (MTTR) the anomalies.

SUMMARY

In view of the foregoing, an embodiment herein provides a processor-implemented method for identifying an anomaly and a root cause of the anomaly in an application using a plurality of shrunk dynamic call graphs. The method includes, generating, using an instrumentation agent, a one or more shrunk dynamic call graphs by providing a shrink factor to the instrumentation agent when the application receives a one or more input requests, wherein the plurality of input requests is received from a user device. The method includes, identifying, using a machine learning model, an anomalous group of the plurality of shrunk dynamic call graphs associated with the plurality of input requests that are failed, from one or more groups of the plurality of shrunk dynamic call graphs. The method includes, identifying a deviation in the plurality of shrunk dynamic call graphs of the plurality of input requests that are failed by comparing the plurality of shrunk dynamic call graphs associated with the plurality of input requests that are failed from the anomalous group with the plurality of shrunk dynamic call graphs associated with the plurality of input requests that are successful. The method includes, identifying an anomaly based on the deviation in the plurality of shrunk dynamic call graphs associated with the plurality of input requests that are failed and an exception thrown around the deviation point as the root cause of the identified anomaly in the application.

In some embodiments, the identification of the anomalous group of the one or more shrunk dynamic call graphs includes (i) obtaining a centroid of a dataset of each input request (ii) obtaining a one or more centroids of each of the one or more groups of the one or more of shrunk dynamic call graphs, (iii) obtaining a one or more centroids based on the exception thrown in each input request, (iv) obtaining, using the one or more centroids, a farthest centroid from the centroid of the dataset, (iv) identifying, using the farthest centroid, a first anomalous group of the one or more shrunk dynamic call graphs associated with the one or more input requests that are failed, (v) identifying, using the farthest centroid, a second anomalous group based on the exception associated with the one or more input requests that are failed, and (vi) identifying the anomalous group if the first anomalous group of the one or more of shrunk dynamic call graphs and the second anomalous group based on the exception are same.

In some embodiments, the method includes creating, using the machine learning model, the one or more groups of the one or more shrunk dynamic call graphs based on a similarity between the one or more shrunk dynamic call graphs after removing repeating patterns in the one or more shrunk dynamic call graphs.

In some embodiments, the one or more groups of the one or more shrunk dynamic call graphs are created when (i) a distance between two points in each group is lower, and (ii) a minimum number of points are used to form a dense region in each group.

In some embodiments, the one or more shrunk dynamic call graphs includes a crest point and a trough point with an absolute height.

In some embodiments, generating the one or more shrunk dynamic call graphs includes (i) identifying a subroutine in the application that receives and handles the plurality of input requests; (ii) inserting probes at each subroutine entry and each subroutine exit in the application; (iii) tracking a running height, a running crest, and a running trough of the subroutine being entered; (iv) obtaining a crest point in the one or more shrunk dynamic call graphs by comparing an absolute difference of the running crest, and the running trough to the shrink factor; (v) repeating the step (ii) and tracking a running height, a running crest, and a running trough of the subroutine being exited; and (vi) obtaining a trough point in the one or more shrunk dynamic call graphs by comparing an absolute difference of the running crest, and the running trough to the shrink factor.

In some embodiments, the crest point or the trough point of one or more shrunk dynamic call graphs is generated when a difference between two adjacent points is greater than the shrink factor. The shrink factor is a constant that specifies an amount of detail captured from the application.

In one aspect, there is provided a system for identifying an anomaly and a root cause of the anomaly in an application using a one or more shrunk dynamic call graphs. The system includes a processor and a non-transitory computer-readable storage medium storing one or more sequences of instructions, which when executed by the processor, causes to: (i) generate, using an instrumentation agent, a one or more shrunk dynamic call graphs by providing a shrink factor to the instrumentation agent when the application receives a one or more input requests, wherein the one or more input requests is received from a user device; (ii) identify, using a machine learning model, an anomalous group of the one or more shrunk dynamic call graphs associated with the plurality of input requests that are failed, from one or more groups of the one or more shrunk dynamic call graphs; (iii) identify a deviation in the one or more shrunk dynamic call graphs of the one or more input requests that are failed by comparing the one or more shrunk dynamic call graphs associated with the one or more input requests that are failed from the anomalous group with the one or more shrunk dynamic call graphs associated with the one or more input requests that are successful; and (iv) identify an anomaly based on the deviation in the one or more shrunk dynamic call graphs associated with the one or more input requests that are failed and an exception thrown around the deviation point as the root cause of identified anomaly in the application.

In some embodiments, the system identities the anomalous group of the one or more shrunk dynamic call graphs by (i) obtaining a centroid of a dataset of each input request, (ii) obtaining a one or more centroids of each of the one or more groups of the one or more shrunk dynamic call graphs, (iii) Obtaining a one or more centroids based on the exception thrown in each input request, (iv) obtaining, using the one or more centroids, a farthest centroid from the centroid of the dataset, (iv) identifying, using the farthest centroid, a first anomalous group of the one or more shrunk dynamic call graphs associated with the one or more input requests that are failed, (v) identifying, using the farthest centroid, a second anomalous group based on the exception associated with the one or more input requests that are failed, and (vi) identifying the anomalous group if the first anomalous group of the one or more shrunk dynamic call graphs and the second anomalous group based on the exception are same.

In some embodiments, the system creates, using the machine learning model, the one or more groups of the one or more shrunk dynamic call graphs based on a similarity between the one or more shrunk dynamic call graphs after removing repeating patterns in the plurality of shrunk dynamic call graphs.

In some embodiments, the system creates the one or more groups of the one or more shrunk dynamic call graphs when (i) a distance between two points in the group is lower, and (ii) a minimum number of points to form a dense region in the group are essential while creating the group of the one or more shrunk dynamic call graphs of a similar one or more input requests.

In some embodiments, the system generates the one or more shrunk dynamic call graphs by: (i) identifying a subroutine in the application that receives and handles the one or more input requests; (ii) inserting probes at each subroutine entry and each subroutine exit in the application; (iii) tracking a running height, a running crest, and a running trough of the subroutine being entered; (iv) obtaining a crest point in the plurality of shrunk dynamic call graphs by comparing an absolute difference of the running crest, and the running trough to the shrink factor; (v) repeating the step (ii) and tracking a running height, a running crest, and a running trough of the subroutine being exited; and (vi) obtaining a trough point in the one or more shrunk dynamic call graphs by comparing an absolute difference of the running crest, and the running trough to the shrink factor.

In another aspect, there is provided one or more non-transitory computer-readable storage medium storing the one or more sequence of instructions, which when executed by one or more processors, causes to perform a method for identifying an anomaly and a root cause of the anomaly in an application using a one or more shrunk dynamic call graphs. The method includes, generating, using an instrumentation agent, a one or more shrunk dynamic call graphs by providing a shrink factor to the instrumentation agent when the application receives a one or more input requests, wherein the one or more input requests is received from a user device. The method includes, identifying, using a machine learning model, an anomalous group of the one or more shrunk dynamic call graphs associated with the one or more input requests that are failed, from one or more groups of the one or more shrunk dynamic call graphs. The method includes, identifying a deviation in the one or more shrunk dynamic call graphs of the one or more input requests that are failed by comparing the one or more shrunk dynamic call graphs associated with the one or more input requests that are failed from the anomalous group with the one or more shrunk dynamic call graphs associated with of the one or more input requests that are successful. The method includes, identifying an anomaly based on the deviation in the one or more shrunk dynamic call graphs associated with the one or more input requests that are failed and an exception thrown around the deviation point as the root cause of identified anomaly in the application.

In some embodiments, the non-transitory computer-readable storage medium storing the one or more sequence of instructions the identifying the anomalous group of the one or more shrunk dynamic call graphs associated with comprises (i) obtaining a centroid of a dataset of each input request, (ii) obtaining a one or more centroids of each of the one or more groups of the one or more shrunk dynamic call graphs, (iii) obtaining a one or more centroids based on the exception thrown in each input request, (iv) obtaining, using the one or more centroids, a farthest centroid from the centroid of the dataset, (iv) identifying, using the farthest centroid, a first anomalous group of the one or more shrunk dynamic call graphs associated with the one or more input requests that are failed, (v) identifying, using the farthest centroid, a second anomalous group based on the exception associated with the one or more input requests that are failed, and (vi) identifying the anomalous group if the first anomalous group of the one or more shrunk dynamic call graphs and the second anomalous group based on the exception are same. In non-transitory computer-readable storage medium storing the one or more sequence of instructions the method further includes creating, using the machine learning model, the one or more groups of the one or more shrunk dynamic call graphs based on a similarity between the one or more shrunk dynamic call graphs after removing repeating patterns in the one or more shrunk dynamic call graphs.

In some embodiments, the non-transitory computer-readable storage medium storing the one or more sequence of instructions, generating the one or more shrunk dynamic call graphs includes (i) identifying a subroutine in the application that receives and handles the one or more input requests; (ii) inserting probes at each subroutine entry and each process exit in the application; (iii) tracking a running height, a running crest, and a running trough of the subroutine being entered; (iv) obtaining a crest point in the plurality of shrunk dynamic call graphs by comparing an absolute difference of the running crest, and the running trough to the shrink factor; (v) repeating the step (ii) and tracking a running height, a running crest, and a running trough of the subroutine being exited; and (vi) obtaining a trough point in the one or more shrunk dynamic call graphs by comparing an absolute difference of the running crest, and the running trough to the shrink factor.

BRIEF DESCRIPTION OF THE DRAWINGS

The embodiments herein will be better understood from the following detailed description with reference to the drawings, in which.

DETAILED DESCRIPTION OF THE DRAWINGS

Figure 1:
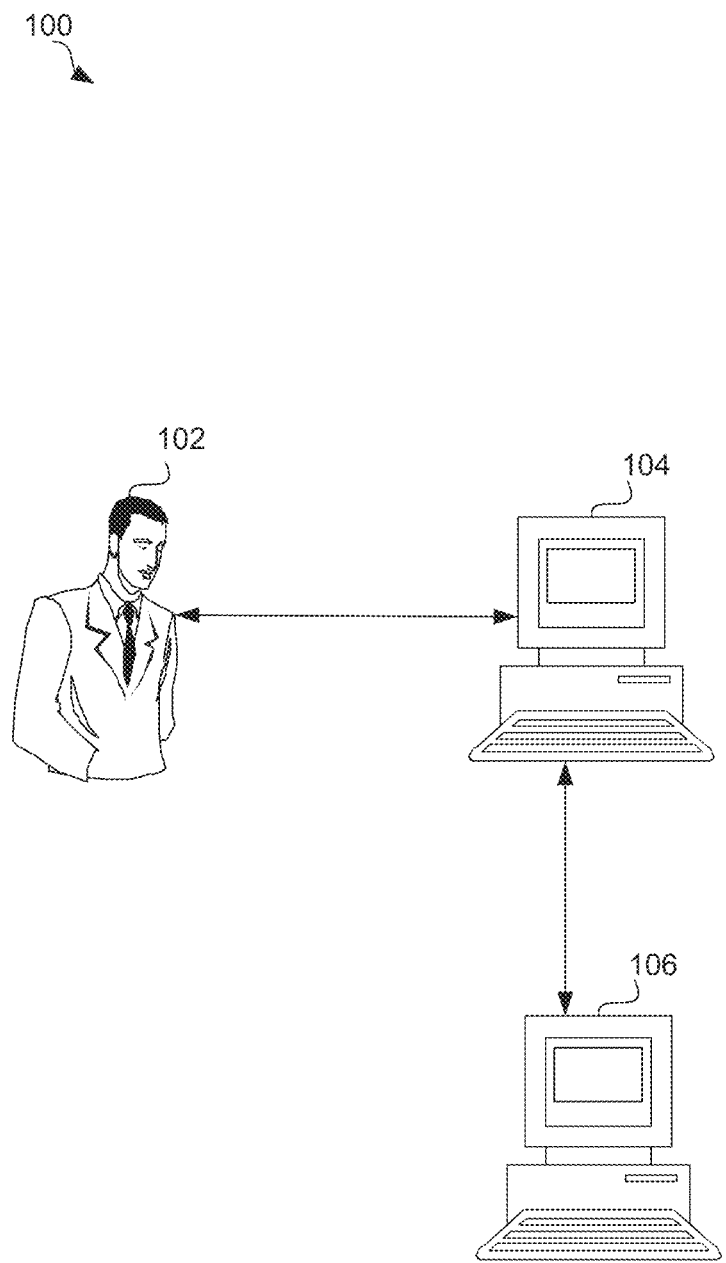
FIG. 1 is a system view that illustrates interaction between a user, a monitored system and an analysis engine according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is a need for a system and method for automatically identifying anomalies and analyzing the root cause of the anomalies in real-time production applications to reduce Mean Time To Repair (MTTR) the anomalies. The embodiments herein achieve this by proposing a system that detects anomalies in real-time production applications and analyze the root cause of the anomalies based on shrunk dynamic call graphs. Referring now to the drawings, and more particularly to FIGS. 1 through 9, where similar reference characters denote corresponding features consistently throughout the figures, preferred embodiments are shown.

FIG. 1 is a system view 100 that illustrates the interaction between a user 102, a monitored system 104 and an analysis engine 106 according to an embodiment herein. The monitored system 104 includes a first processor and a first memory that stores a first set of instructions that are executed by the first processor. The monitored system 104 includes, but is not limited to, a handheld device, a mobile phone, a kindle, a Personal Digital Assistant (PDA), a tablet, a laptop, a music player, a computer, an electronic notebook, or a smartphone and the like. The monitored system 104 runs an application to be monitored and detects for one or more anomalies. The analysis engine 106 includes a second processor and a second memory that stores a second set of instructions which are executed by the second processor. The analysis engine 106 includes, but is not limited to, a handheld device, a mobile phone, a kindle, a Personal Digital Assistant (PDA), a tablet, a laptop, a music player, a computer, an electronic notebook, or a smartphone and the like. The user 102 is a user of the monitored system 104. In one embodiment, the user 102 may interact with the monitored system 104 using standard tools or interfaces like web browser over http protocol. The monitored system 104 is provided with an instrumentation agent. The instrumentation agent instruments the application running on the monitored system 104. In one embodiment, the instrumentation agent inserts monitoring code or call tags into the monitored system 104. The instrumentation agent generates one or more shrunk dynamic call graphs by providing a shrink factor and an exception from the monitored system 104 for each input request from the user 102. The monitored system 104 interacts with the analysis engine 106 and transmits the shrunk dynamic call graph to the analysis engine 106 over a network. The network includes, but is not limited to, a wireless network, a wired network, a combination of the wired network and the wireless network or Internet, and the like. The analysis engine 106 identifies, using a machine learning model, an anomalous group of the one or more shrunk dynamic call graphs associated with the one or more input requests that are failed, from one or more groups of the one or more shrunk dynamic call graphs. The analysis engine 106 identifies a deviation in the one or more shrunk dynamic call graphs of the one or more input requests that are failed by comparing the one or more shrunk dynamic call graphs associated with the one or more input requests that are failed from the anomalous group with the one or more shrunk dynamic call graphs associated with the one or more input requests that are successful. The analysis engine 106 identifies an anomaly based on the deviation in the one or more shrunk dynamic call graphs associated with the one or more input requests that are failed and an exception thrown around the deviation point as the root cause of the identified anomaly in the monitored application.

Figure 2A:
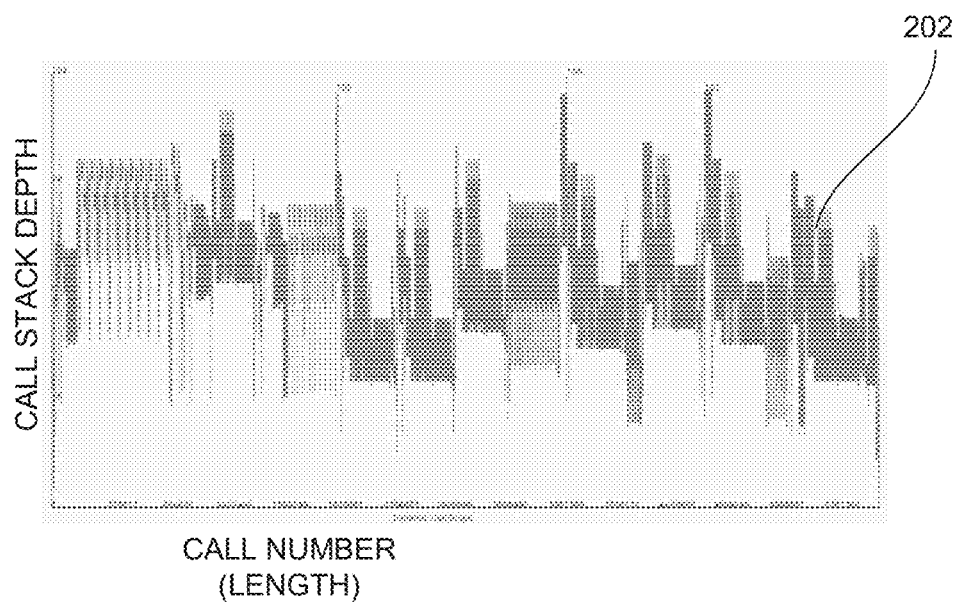
FIG. 2A is an exemplary graphical representation of a sample dynamic call graph collected from a live running application according to an embodiment herein.

FIG. 2A is an exemplary graphical representation of a sample dynamic call graph collected from a live running application according to an embodiment herein. The dynamic call graph has call stack depth on the vertical axis and method invocation count or call number on the horizontal axis. The dynamic call graph recording starts when program's starting method (such as main( ) method or in the case of web application when the web server receives a request and invokes a starting method to start request processing such as service( ) method) is invoked and ends when such method exits. An instrumentation agent inserts monitoring code or probes or call-tags at each method entry and exit points of each class in the live running application. The probes at method entry may record as method being entered. In one embodiment, the probes at method entry may record optionally a method name, a class name, and a package name. In an exemplary scenario, the probes record >com.sg.SampleProgram.main at the time of method entry where > means a method entry and com.sg.SampleProgram.main is a package name, class name, and method name. The probes at method exit may record as the method being exited. In one embodiment, the probes may record optionally a method name, a class name, and a package name. In an exemplary scenario, the probes record <com.sg.SampleProgram.main at the time of method exit where <means a method exit and com.sg.SampleProgram.main is a package name, class name, and method name. The method where the dynamic call graph recording starts and ends is also inserted with additional probes that will start and end dynamic call graph recording. At the time of entry into such a method, first, a place holder data structure is created and stored in a map with currently running thread name of the running application as the key. The map with the thread name as the key is used to store place holder data structure to avoid data corruption in a multithreaded environment. As methods are entered and exited, this place holder data structure is appended with entry/exit recordings by method entry/exit probes. At the time of the exiting method that ends recording, the recordings in the place holder data structure corresponding to the currently running thread will be persisted into a file on the hard disk and corresponding entry is removed from the map.

Figure 2B:
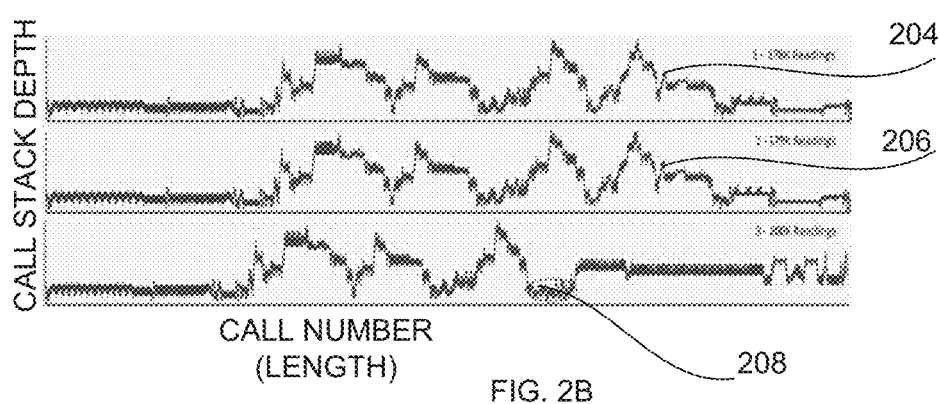
FIG. 2B is an exemplary graphical representation of three dynamic call graphs for three executions of the same program according to an embodiment herein.

FIG. 2B is an exemplary graphical representation of three dynamic call graphs for three executions of the same program according to an embodiment herein. In FIG. 2B, 204 and 206 represent dynamic call graphs of successful execution of the live running application and 208 represents dynamic call graph of failed execution of the live running application which includes significant deviation from the dynamic call graphs 204 and 206. The dynamic call graphs 208 of failed executions of the live running application have major deviations compared to the dynamic call graphs 204 and 206 of the successful executions of the live running application. The failed executions of the live running application execute different code branches after error/exception which becomes visible in the call graph representation.

Figure 3:
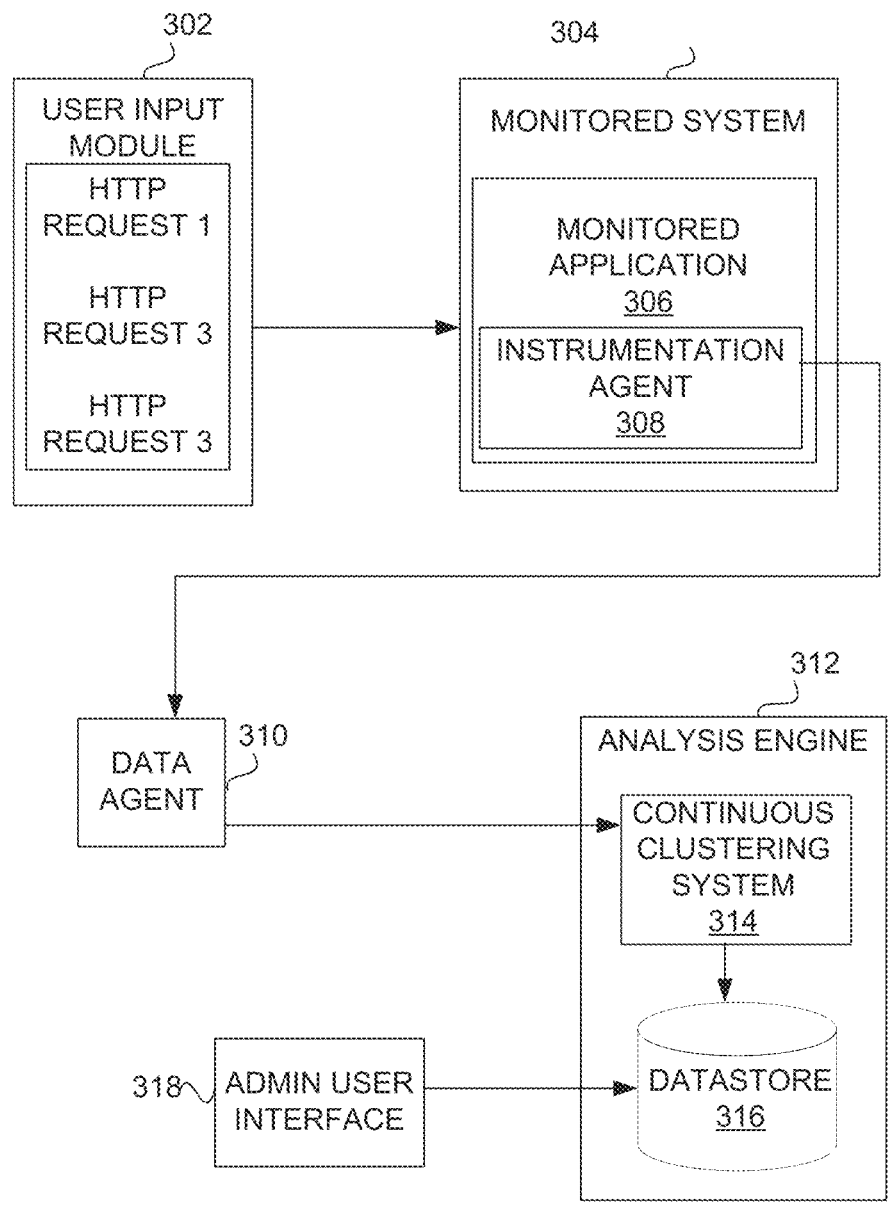
FIG. 3 illustrates a schematic representation of anomaly detecting and root cause automation system according to an embodiment herein.

FIG. 3 illustrates a schematic representation of anomaly detecting and root cause automation system 100 according to an embodiment herein. The anomaly detecting and root cause automation system 100 includes a user input module 302 that sends input requests to a monitored application 306, a monitored system 304 that runs the monitored application 306 and an analysis engine 312. In one embodiment, the input request may include http request 1, or http request 2, or http request 3. The monitored application 306 includes instrumentation agent 308 that scans millions of lines of application code of the monitored application 306 and automatically injects monitoring code or probes or call tags in the monitored application 306. The instrumentation agent 308 (monitoring code or probes or call tags) generates one or more shrunk dynamic call graphs by providing a shrink factor and an exception from the monitored application 306 when the user input module 302 initiates a request to the monitored system 304. The shrunk dynamic call graph is a less detailed representation of a dynamic call graph of the monitored application 306. The shrunk dynamic call graph is obtained as a result of ignoring finer details in the dynamic call graphs and retaining only overall meaning (large patterns or major changes or summary or important nodes) of the dynamic call graphs. In one embodiment, the shrunk dynamic call graphs considered as a skeleton of the dynamic call graph and the shrunk dynamic call graphs can be generated faster without losing overall meaning and helps in making certain decisions. The monitored system 304 transfers the shrunk dynamic call graph to the analysis engine 312 over a network. The analysis engine 312 detects anomalies in the monitored application 306 based on the shrunk dynamic call graphs. In one embodiment the analysis engine 312 compares the shrunk dynamic call graphs of the monitored application 306 with the shrunk dynamic call graphs of the successful execution to identify a deviation point in the shrunk dynamic call graphs of the monitored application 306.

In one embodiment, large patterns in the dynamic call graphs generated for multiple runs of an operation of the monitored application 306 are mostly similar. In one embodiment, the similar patterns can be extracted using pattern recognition methods or machine learning algorithms from multiple executions of an operation of the monitored application 306 and extracted knowledge of patterns is used to detect anomalies in subsequent executions of the same operation of the monitored application 306. In one embodiment, any deviation in the patterns of subsequent executions of the monitored application 306 compared to the knowledge of patterns from majority executions of the monitored application 306 indicates anomalous behavior. As the shrunk dynamic call graphs retain large patterns or overall meaning of dynamic call graphs, this raises the need for efficient ways to generate shrunk dynamic call graphs.

The shrunk dynamic call graphs of the monitored application 306 are either stored on the hard disk of monitored system 304 or forwarded to the analysis engine 312 over the network. In an embodiment, a data agent 310 collects the shrunk dynamic call graphs and the errors or exceptions from the hard disk of the monitored system 304 and forwards the collected shrunk dynamic call graphs and the errors or exceptions to the analysis engine 312 over the network. The continuous clustering system 314 in the analysis engine 312 analyses, using machine learning, the shrunk dynamic call graphs to find anomalies in the monitored application 306, determine the root cause of the anomalies and provide alerts. A data store 316 in the analysis engine 312 stores detected anomalies and root causes of the anomalies by the analysis engine 312. The analysis engine 312 runs on a separate machine with a processor and memory. In an embodiment, the analysis engine 312 can be on-prem or on cloud and should be connectable over a network protocol. In some embodiments, in case of haps request as input, admin user interface 318 may send to the analysis engine 312 directly, as it is a secured version.

Figure 4A:
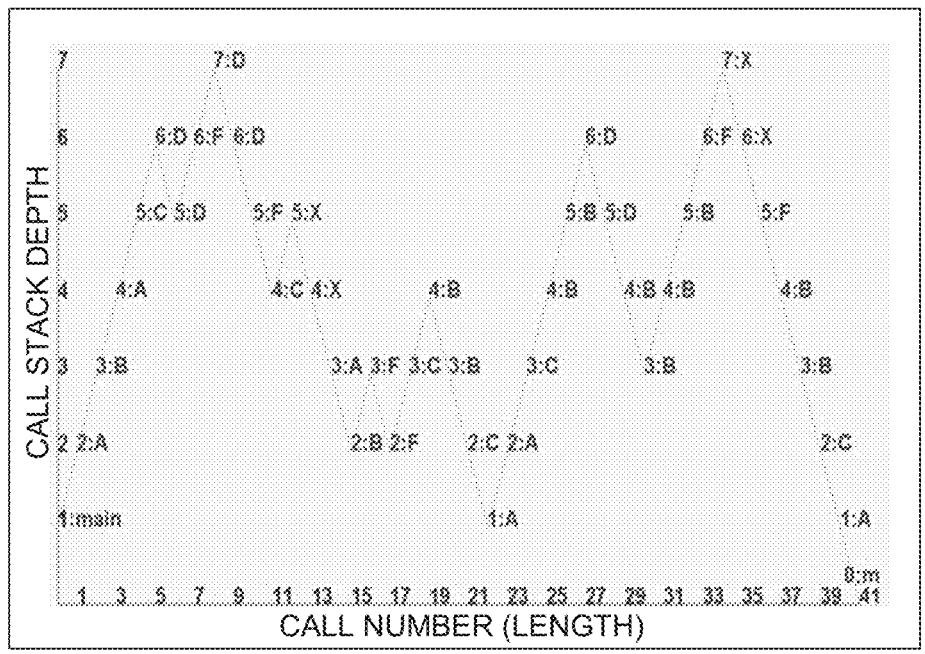
FIG. 4A is an exemplary visual representation of the dynamic call graph drawn with stack depth as height on the y-axis and call number as length on the x-axis according to an embodiment herein.

FIG. 4A is an exemplary visual representation of the dynamic call graph drawn with stack depth as height on the y-axis and call number as length on the x-axis according to an embodiment herein. The first invoked method is assigned by a call number 0, next invoked method is assigned by a call number 1 and so on. The peak points (6:D, 7:D, 5:X, 3:F, 4:B, 6:D, 7:X) on the graph are called as crest points and the lowest points (1:main, 5:D, 4:C, 2:B, 2F, 1:A, 3:B, 0:main) on the graph are called as trough points.

In one embodiment, a shrink factor defines the amount of detail that needs to be removed from the dynamic call graph of the monitored application for generating the shrunk dynamic call graph, wherein the shrunk dynamic call graph includes only crest points and trough points with absolute height difference between any two adjacent points is greater than the given shrink factor. The peak points of the dynamic call graphs are considered as crest nodes, and the lowest points of the dynamic call graphs are considered as trough nodes. In one embodiment, a greater amount of detail is removed from the dynamic call graph when the shrink factor is higher. In one embodiment, a lesser amount of detail is removed from the dynamic call graph when the shrink factor is smaller.

In one embodiment, the method of shrinking includes (i) removing intermediate nodes in the dynamic call graph, (ii) retaining only crest nodes and trough nodes in the dynamic call graph, (iii) moving resulting nodes to left by the number of preceding nodes removed, (iv) removing every edge in the resulting nodes whose height is less than or equal to shrink factor, (v) removing nodes of the removed edge, (vi) joining broken links, and (vii) moving resulting nodes to left by the number of preceding nodes removed to generate the shrunk dynamic call graph.

Figure 4B:
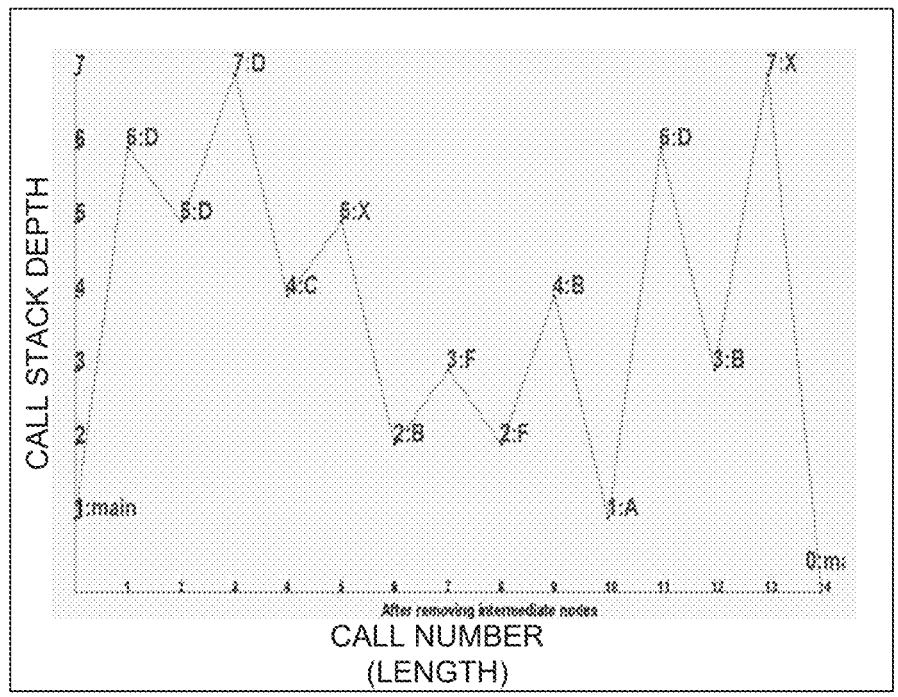
FIG. 4B shows a resulting graph after removing intermediate nodes in the process of shrinking according to an embodiment herein.

FIG. 4B shows a resulting graph after removing intermediate nodes in the process of shrinking (after steps i, ii, and iii) according to an embodiment herein. The shrinking process removes nodes 2:A, 3:B, 4:A, 5:C, 6:F, 6:D, 5:F, 4:X, 3:A, 3:C, 3:B, 2:C, 2:A, 3:C, 4:B, 5:B, 5:D, 4:B, 4:B, 5:B, 6:F, 6:X, 5:F, 4:B, 3:B, 2:C and 1:A from the dynamic call graph of the FIG. 4A.

Figure 4C:
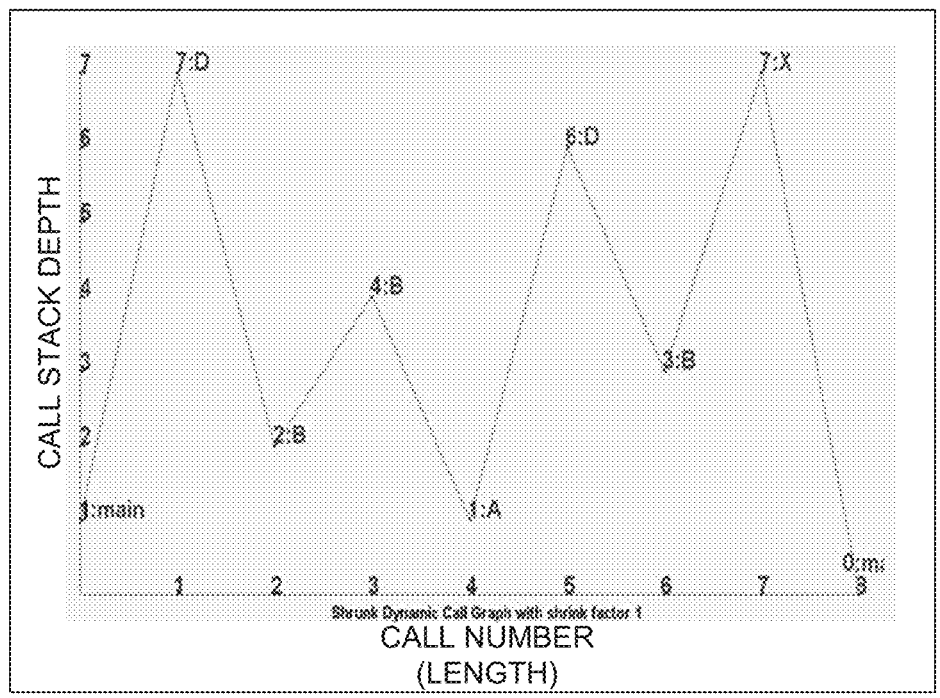
FIG. 4C shows a resulting shrunk dynamic call graph after shrinking with shrink factor 1 according to an embodiment herein.

FIG. 4C shows a resulting shrunk dynamic call graph after shrinking with shrink factor 1 according to an embodiment herein. After steps iv, v, vi and vii on the graph in FIG. 4B, the edge 3:F-2:F of height 1, and it's nodes 3:F and 2:F are removed and the broken links are joined to form a longer edge 7:D-2:B (Note that edge 4:C-5:X is also removed in the shrinking process). Edge 2:B-3:F merges into edge 2:B-4:B.

Figure 4D:
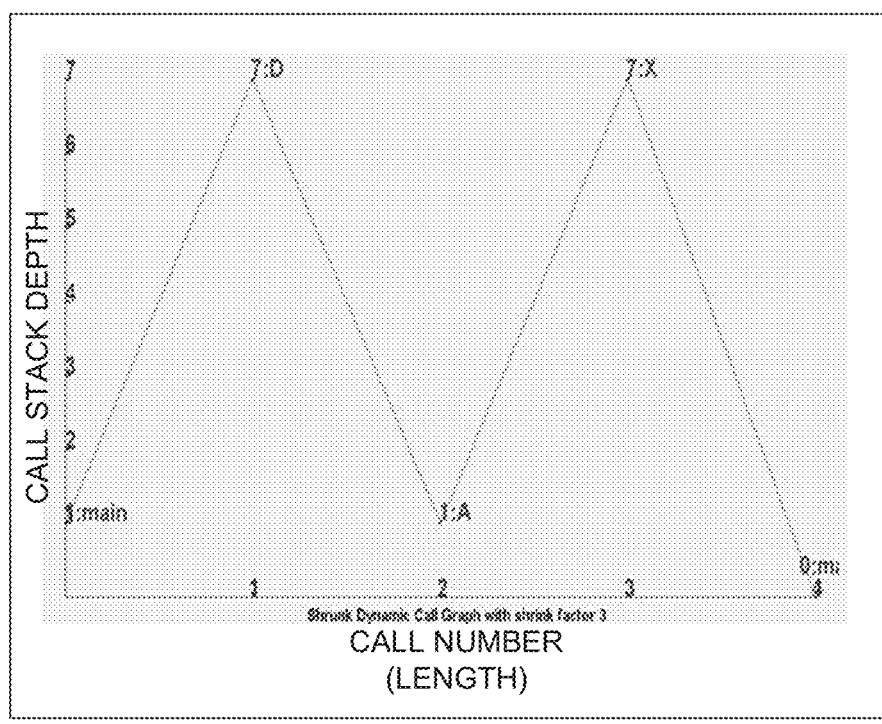
FIG. 4D shows a resulting shrunk dynamic call graph after shrinking with shrink factor 3 according to an embodiment herein.

FIG. 4D shows a resulting shrunk dynamic call graph after shrinking a dynamic call graph in FIG. 4A with shrink factor 3 according to an embodiment herein.

In one embodiment, shrink factor defines, to instrumentation agent 308, the amount of detail that needs to be recorded from running programs such that the resulting shrunk dynamic call graph contains only crest points and trough points with absolute height difference between any 2 adjacent points is greater than the given shrink factor.

In one embodiment, while generating shrunk dynamic call graphs directly from the live running application, the appropriate shrink factor is provided as input to the probes. In an embodiment, the shrink factor is configurable and updatable dynamically. The amount of detail generated by the probes in shrunk dynamic call graphs of the live running application depends on the shrink factor applied. In one embodiment, the amount of detail generated in the shrunk dynamic call graph is maximum when the shrink factor is less. The amount of detail generated in the shrunk dynamic call graph is minimum when the shrink factor is high. In an embodiment, using appropriate shrink factor the probes capture less detail in the shrunk dynamic call graph without distorting the meaning. In an embodiment, the desired shrink factor may be determined by testing the live running application with different shrink factors and choosing the one with the best result.

In one embodiment, a method of the live running application that receives and handles input requests from user 102 is identified. In an exemplary embodiment, the method is a start-end method for shrunk dynamic call graphs. The instrumentation agent 308 inserts the method entry probe at every method entry and the method exit probe at every method exit of all classes of the monitored application 306 in the monitored system 304. The probes at method entry or exit tracks three parameters, a running height (or depth of the stack), a running crest and a running trough. The probe compares the absolute difference of the running crest and the running trough to the shrink factor and chooses to record running crest/trough based on the value of an index variable, where index is a running counter indicating number of nodes recorded. The recorded data includes an entry/exit, a method name, a class name and a package name of the recorded running crest/trough's node. In an exemplary embodiment, the instrumentation agent records at method entry includes 10>com.sg.SampleProgram.main (or just 10), where 10 is a running crest/trough, >means it is a method entry, com.sg.SampleProgram is class name including package name and main is the method being entered. In one embodiment, the start-end method is also inserted with additional probes that will start and end capturing shrunk dynamic call graph, capture the received HTTP method, GET/POST request parameters, thread name, HTTP response status code, session information, etc. In one embodiment, at the time of method entry, the monitored system 304 creates a place holder data structure and stores in a map with currently running thread name of the live running application as key. In one embodiment, to avoid data corruption in a multi-threaded environment, the map with the thread name as the key is used to store the place holder data structure. When the place holder data structure is created, the place holder data structure will be updated with the operation name of the request, it can be http URL in a web application. The operation name may be used in an analysis part for grouping shrunk dynamic call graphs of the same operation. As methods are entered and exited, including the start-end method, this place holder data structure is appended with running trough/running crest recordings by probes. At the time of exiting the start-end method, the recordings in the place holder data structure, corresponding to the currently running thread, will be persisted into a file on the hard disk and then corresponding entry is removed from the map. In one embodiment, additional probe is executed at entry into the start-end method to record the first node of the shrunk dynamic call graph.

In one embodiment, the instrumentation agent 308 inserts appropriate probes to collect thrown errors and exceptions while executing a live running application. The thrown errors and exceptions are recorded and marked with the nearest running crest/running; trough of shrunk dynamic call graph being recorded.

Figure 5A:
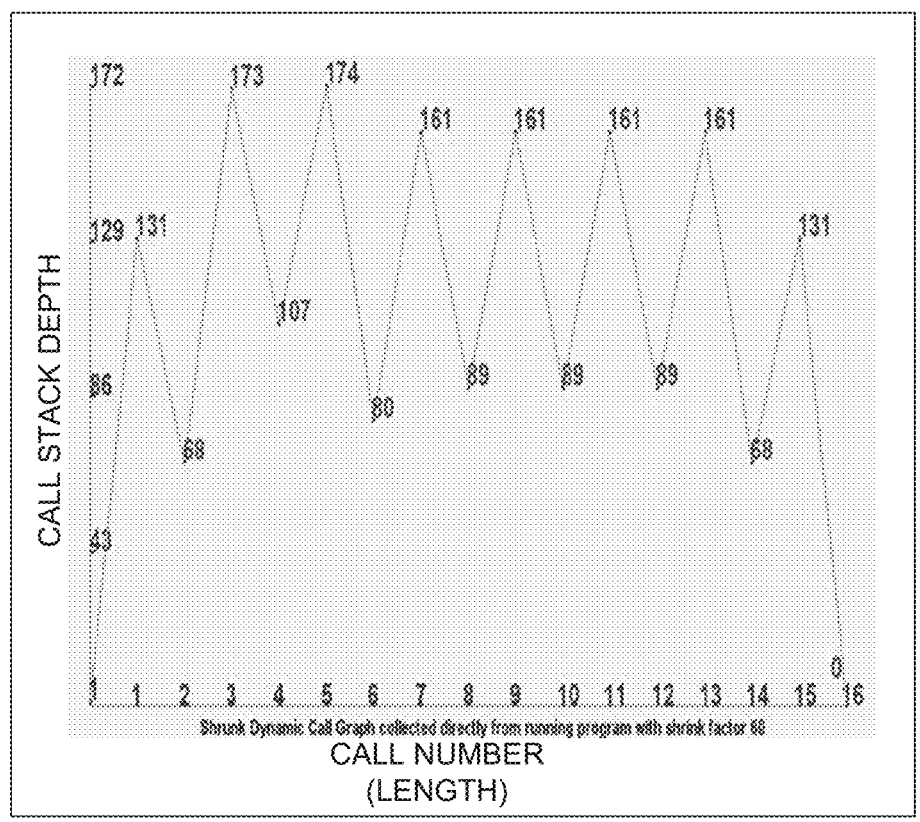
FIG. 5A shows an exemplary shrunk dynamic call graph collected from a running program using shrink factor 60 according to an embodiment herein.

FIG. 5A shows an exemplary shrunk dynamic call graph collected from a running program using shrink factor 60 according to an embodiment herein. The instrumentation agent 308 continuously generates shrunk dynamic call graphs for each input request or invocation from the user 102 for the live running application. The instrumentation agent 308 stores them on a hard disk or forwards them to the analysis engine 312 over the network. In one embodiment, if the shrunk dynamic call graphs are stored on the hard disk, the data agent 310 continuously forwards the shrunk dynamic call graphs to the analysis engine 312 over the network.

In one embodiment, the shrunk dynamic call graph is a skeleton representation of a dynamic call graph and captures the meaning of the dynamic call graph of the live running application in 10 to 30 recordings or nodes. In one embodiment, as the shrunk dynamic call graph is only a skeleton representation of dynamic call graph, its generation from running program may consume very less memory and thus it helps in an exponential increase in response times.

Figure 5B:
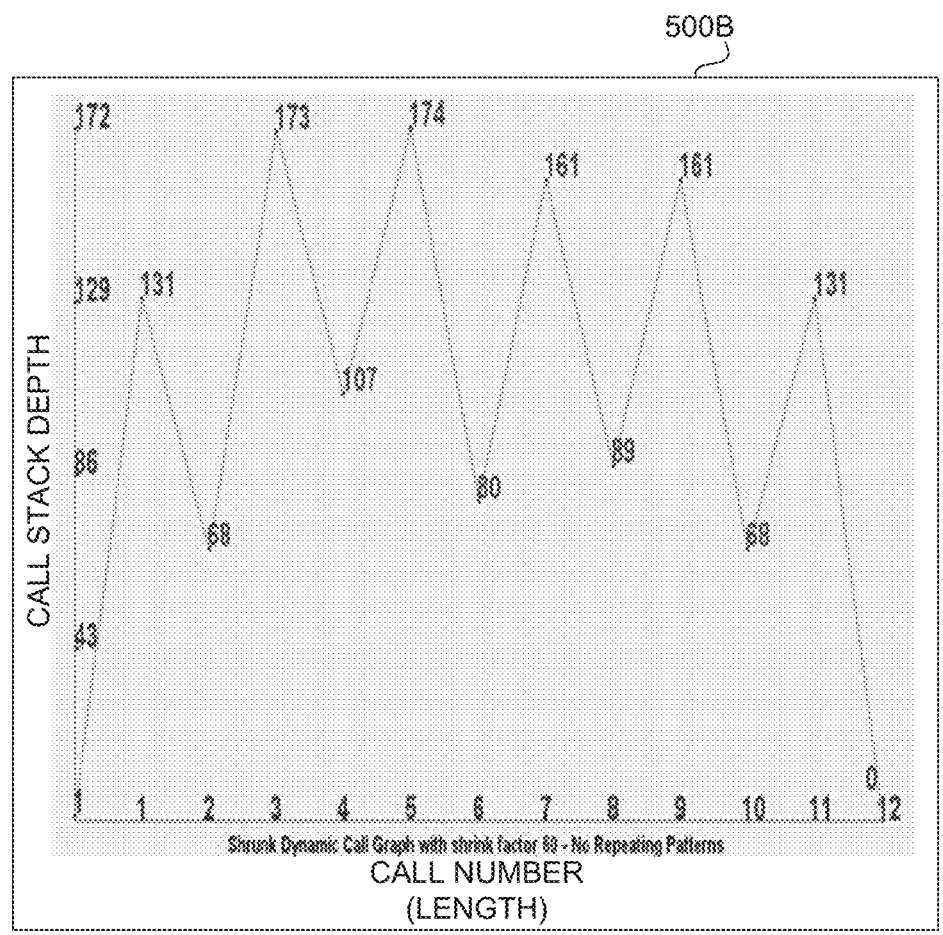
FIG. 5B shows the shrunk dynamic call graph after removing repeating patterns according to an embodiment herein.

In FIG. 5A, a pattern 89-161 is repeating 3 times in the shrunk dynamic call graph. The repeating patterns are formed due to loops or recursive execution of code in the live running application which can be considered noise. The repeating patterns except a single pattern can be safely removed without losing the meaning. The repeating patterns are removed from all shrunk dynamic call graphs. The resulting shrunk dynamic call graph after removing repeating patterns in FIG. 5A is shown in FIG. 5B.

In one embodiment, the monitored system performs real-time data analysis. The analysis engine 312 uses unsupervised learning algorithms such as DBSCAN.

In one embodiment, the shrunk dynamic call graphs of same operation type look similar because they execute same code branches in the live running application. In an embodiment, the shrunk dynamic call graphs are grouped into homogenous groups according to the operation type (HTTP URL or functionality) and DBSCAN is applied separately for each group. Though the shrunk dynamic call graphs of the same operation type appear similar, they may have small differences. Due to this small difference in the shrunk dynamic call graphs, the shrunk dynamic call graphs form into multiple clusters when DBSCAN is applied.

Figure 5C:
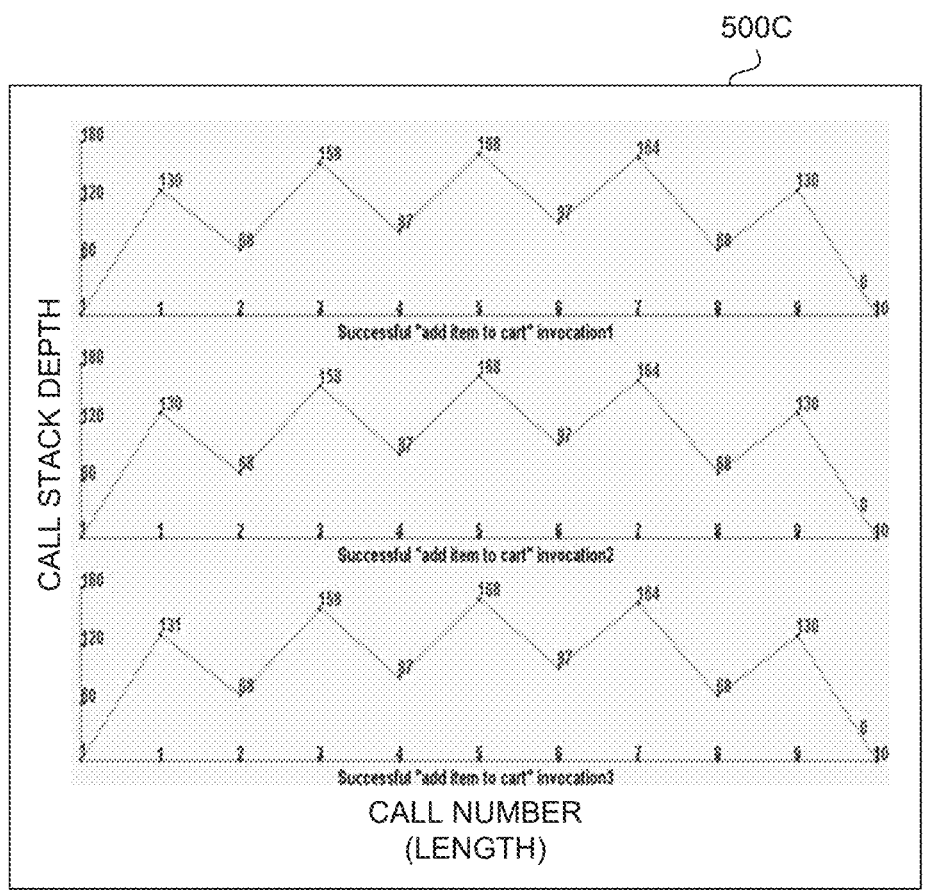
FIG. 5C shows one set of three invocations of an operation type forming into same cluster using DBSCAN according to an embodiment herein.

FIG. 5C shows one set of three invocations of an operation type forming into the same cluster using DBSCAN according to an embodiment herein. FIG. 5C includes three invocations of "add item to cart" operation in an e-commerce application that all look similar. Though the invocation 3 appears different at node 131 at length 1 however all three invocations invocation1, invocation2 and invocation3 forms into the same cluster using DBSCAN with appropriate minPoints and epsilon parameters.

Figure 5D:
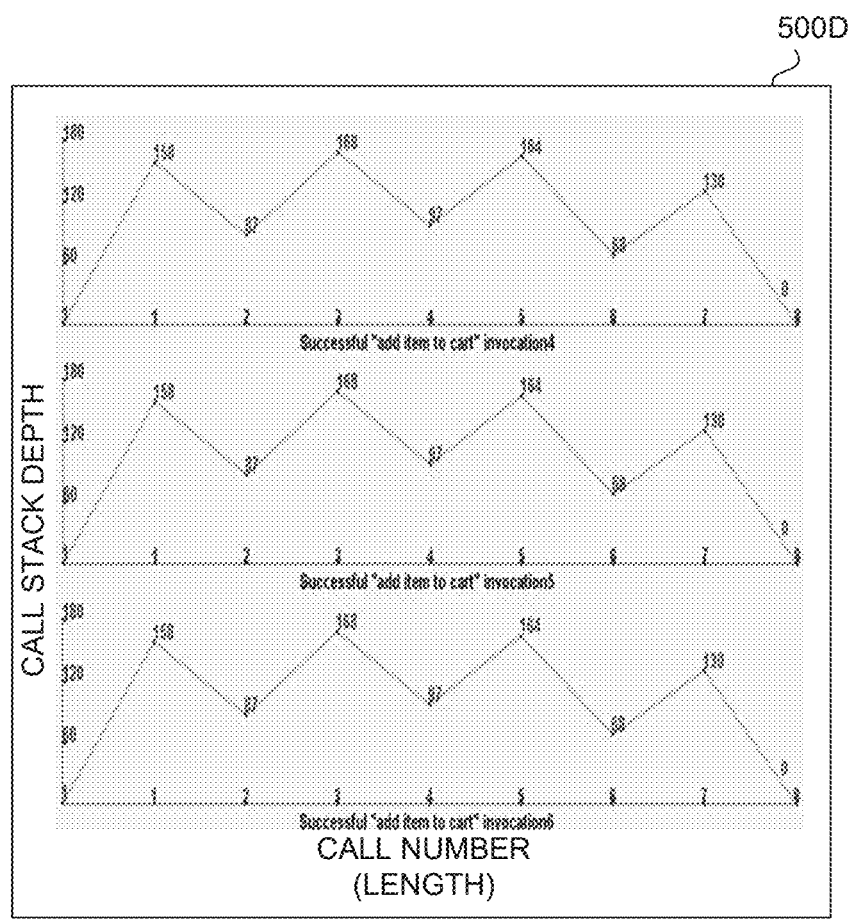
FIG. 5D shows another set of three invocations of an operation type forming into another duster using DBSCAN according to an embodiment herein.

FIG. 5D shows another set of three invocations of an operation type forming into another cluster using DBSCAN according to an embodiment herein. FIG. 5D shows three invocations of the same "add item to cart" operation in the same e-commerce application that appears the same. The invocation 4, invocation 5 and invocation 6 forms into another cluster using DBSCAN.

In one embodiment, the anomaly detecting and root cause automation system 100 uses machine learning which requires large amounts of data. In one embodiment, the anomaly detecting and root cause automation system 100 waits for the running application to execute for some time while user 102 is accessing the application in monitored system 304. The anomaly detecting and root cause automation system 100 (i) removes the repeating patterns from the shrunk dynamic call graphs after collecting enough data, (ii) applies unsupervised machine learning algorithms like DBSCAN to create clusters. The number of clusters in data is unknown, as the anomaly detecting and root cause automation system 100 is performing real-time analysis and clustering. In one embodiment, the DBSCAN automatically creates clusters based on minPoints, epsilon, and a distance function. In an embodiment, the DBSCAN filters out noise due to class loading (in a few programming languages) using an appropriate minPoints.

In one embodiment, minPoints specifies the minimum number of points to form a dense region or a cluster. For example, if the minPoints parameter as 5, then at least 5 points is required to form a dense region or a cluster. In one embodiment, with DBSCAN's minPoints parameter, an anomaly occurs at least minPoints number of times for them to form into a cluster. If the epsilon is smaller, the number of clusters created by DBSCAN is larger and vice-versa. In an embodiment, the optimal values of epsilon are detected by the elbow method or silhouette method.

In one embodiment, the DBSCAN continuously creates clusters as new shrunk dynamic call graphs are received. The continuous clustering is performed when shrunk dynamic call graphs are received or at regular intervals.

In one embodiment, the number of clusters may vary over time. The continuous clustering occurs as a result of the dynamic reception of data over an unknown and potentially indefinite time period. In an embodiment, the clusters are formed incrementally.

In one embodiment, as the anomaly detecting analysis in real-time is automated, the labeling of clusters is also automated and real-time. The output data from the anomaly detecting and root cause automation system 100 indicates to distinguish between an anomaly execution and a successful execution. In one embodiment, the anomaly detecting and root cause automation system 100 assumes that anomalies occur rarely. In one embodiment, if the majority of the invocations of an operation type are successful, the indication from the output data of the anomaly detecting and root cause automation system 100 is obtained. In one embodiment, the anomaly detecting and root cause automation system 100 helps when more than 50% of the invocations of an operation are successful.

In one embodiment, the analysis engine 106 for each operation type, a) creating clusters based on shrunk dynamic call graphs with unsupervised machine learning algorithm DBSCAN b) finding the centroid C of all shrunk dynamic call graphs c) finding centroids K1, K2, K3 etc., for each cluster d) using centroids, finding the centroid Ki that is farthest from centroid C and take note of its cluster. The farthest centroid Ki from centroid C is an outlier and its cluster is a point for becoming an anomaly. The recorded cluster of centroid Ki is a candidate for becoming an anomaly since the centroid C of the dataset drifts towards majority invocations (dense population) which are successful. The data points of anomaly invocations lie far away from the centroid C of the dataset.

In another preferred embodiment, the analysis engine 106 detects outlier cluster based on exceptions or error data of the Shrunk Dynamic Call Graphs by (a) calculating count of each exception or error from the entire dataset of the operation type of the running program; (b) providing weights to exceptions or errors based on number of times that occurred, (c) calculating average exception weight for every cluster obtained using DBSCAN by (i) adding weights of every exception or error of every data item of the cluster (ii) ignoring duplicate exception or error while adding weights to exception/error of the data item in the cluster and (iii) dividing result with number of data items in the cluster, (d) identifying and recording the cluster with highest average exception weight. The cluster with the highest average exception weight becomes an anomaly candidate. If the cluster with the highest average exception weight and the cluster of farthest centroid Ki are the same, then the analysis engine 106 considers that cluster as anomaly and report for review and action.

Figure 6A:
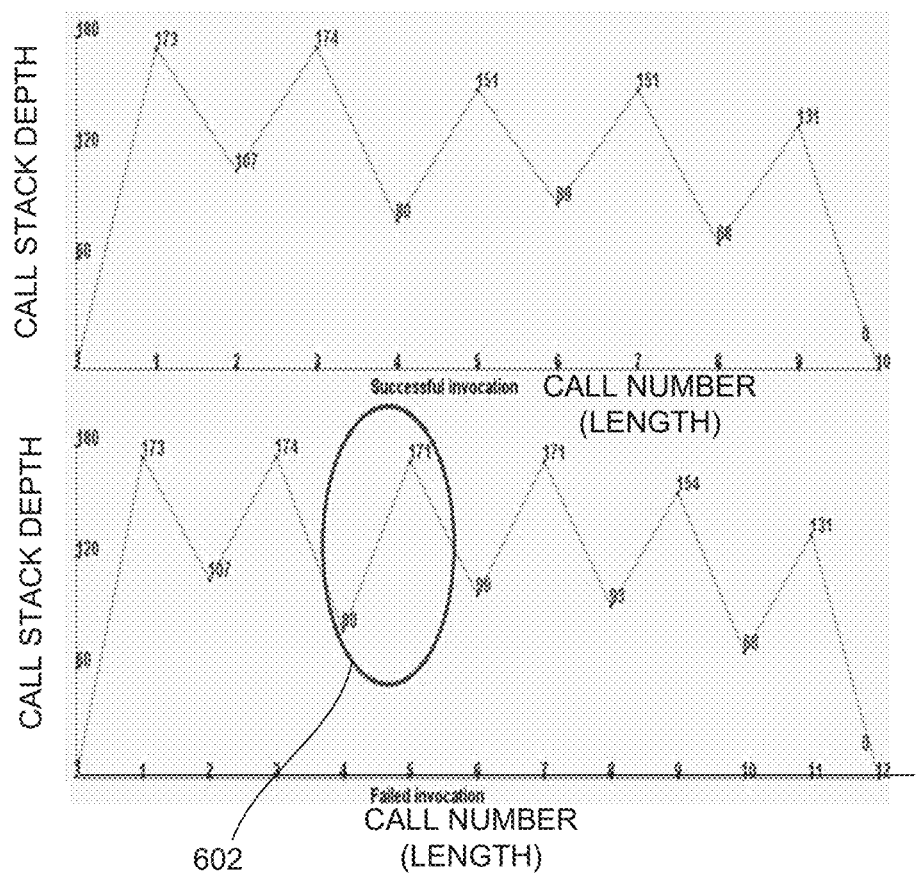
FIG. 6A illustrates a comparison of anomaly shrunk dynamic call graph to success shrunk dynamic call graph to identify the deviation point according to an embodiment herein.

FIG. 6A illustrates a comparison of an anomaly shrunk dynamic call graph to a success shrunk dynamic call graph to identify the deviation point according to an embodiment herein. In FIG. 6A, the shrunk dynamic call graph of anomaly invocation continues to execute like a success invocation until it deviates after node of height 80 (at length 4) as highlighted in circle 602. The shrunk dynamic call graph of anomaly invocation is compared to the shrunk dynamic call graph of success invocation. By finding which exception/error thrown in the data item of anomaly invocation compared to data item of success invocation, around nodes 80 and 171 of anomaly invocation may give root cause exception/error of anomaly. When the instrumentation agent collects exceptions/errors, the node around which the exceptions/errors are thrown is also marked.

The analysis engine 106 considers that cluster as an anomaly and generates a report that includes anomaly information for review and action. In one embodiment, the report may include (a) HTTP URL of the request in case of web application or operation type, (b) HTTP request type such as GET, POST, UPDATE, (c) thread name that processed the invocation, (d) HTTP request parameters (GET parameters or POST parameters), (e) HTTP session-id or user details, (f) HTTP response status code, (g) exception or error causing the anomaly, (h) All exceptions or errors thrown while processing anomalous invocation, (i) anomaly cluster size, which indicates number of times the operation has been anomalous.

In an alternate embodiment, the analysis engine 106 gives ranks to clusters of shrunk dynamic call graphs by, (i) finding centroid C of entire dataset of the operation type of the running program (ii) finding centroids K1, K2, K3 etc of each cluster of the operation type of the running program (iii) calculating the distance Di of each cluster centroid Ki to the centroid C, arranging the distances Di of the clusters in descending order, ranking the clusters based on the distance to centroid C. The cluster whose centroid K is farthest from the centroid C is ranked as first. Clusters are also similarly ranked using exceptions/errors data. Average of both ranks is calculated for each cluster. The cluster with highest average rank is a possible anomaly cluster and reported for review and action. Other clusters may also be reported in the order of average rank with appropriate severity.

In one embodiment, it is possible in a production-grade application that each invocation of an operation is successful. In such a case, the anomaly detecting and root cause automation system 100 finds each cluster is successfully processed. In an embodiment, the anomaly detecting and root cause automation system 100 is using two types of data, shrunk dynamic call graphs and exceptions/errors in determining anomalous cluster and the anomaly detecting and root cause automation system 100 marks a cluster as anomaly only if both types of data determines the same cluster as outlier. In an embodiment, if shrunk dynamic call graphs data processing finds a cluster as an outlier and not by exceptions/error data processing, no cluster is detected as anomalous and, in that case, each invocation of an operation is successful. In an embodiment, the anomaly detecting and root cause automation system 100 avoids marking a cluster as an anomaly when each invocation of an operation is successful, giving accurate results.

In another embodiment, if needed an additional layer of protection can be placed by defining the percentage majority of invocations, which are successful, is at least 80%. In an embodiment, if the anomaly detecting and root cause automation system 100 finds a cluster as anomalous, such cluster size is less than 20% of the size of the dataset of that operation type, or as needed and appropriate the ratio can be set as 70% to 30% and this value is dynamically configurable/updatable.

In one embodiment, it is suggested to instrument all methods of all classes in the application/program. There is exponential performance gain in generating shrunk dynamic call graphs compared to generating dynamic call graphs. However, it is essential to understand that the system doesn't need to instrument all methods of all classes of monitored application 306. The system can still capture the overall meaning by instrumenting only a partial code base. For this instrumentation agent 308 can be designed to restrict a set of methods/classes/packages to be instrumented through include and exclude filters and accordingly perform probe insertion. How much % of the codebase or what classes/packages to be instrumented can be decided based on a few test-runs of the application. In a complex application/program as low as 20% of codebase instrumentation is enough to generate meaningful shrunk dynamic call graphs. With only 20% code instrumented, overhead on the monitored application 306 is guaranteed to reduce by a factor of 5 on top of exponential performance gain in generating shrunk dynamic call graphs.

In one embodiment, the meaning captured in the shrunk dynamic call graphs with one set of shrink factor, by including and excluding filters is different from the meaning captured in the shrunk dynamic call graphs with other set of shrink factor, include and exclude filters. In one embodiment, before using the anomaly detecting and root cause automation system in production applications appropriate values for settings need to be identified/calculated and used.

In one embodiment, the instrumentation agents continuously generate shrunk dynamic call graphs (for every http request or invocation) from running applications.

Figure 6B:
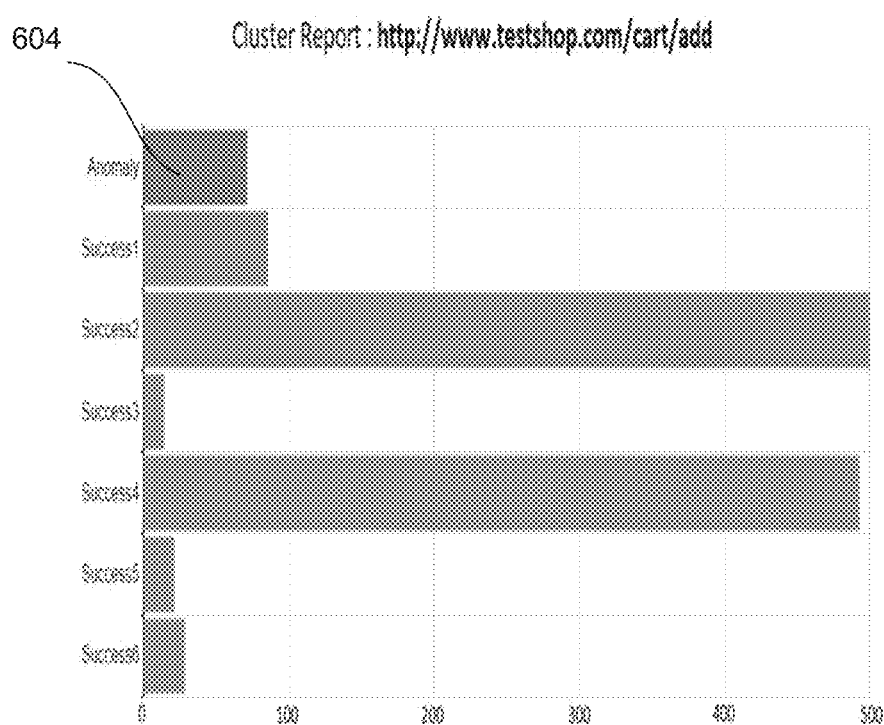
FIG. 6B illustrates an exemplary cluster report for clusters created by DBSCAN for an operation type during test execution of e-commerce application according to an embodiment herein.

FIG. 6B illustrates an exemplary cluster report for clusters created by DBSCAN for an operation type during test execution of e-commerce application according to an embodiment herein. FIG. 6B shows one anomaly cluster 604 of size 80 and 6 success clusters of different sizes. The size of the bar indicates number of executions of the operation.

Figure 7:
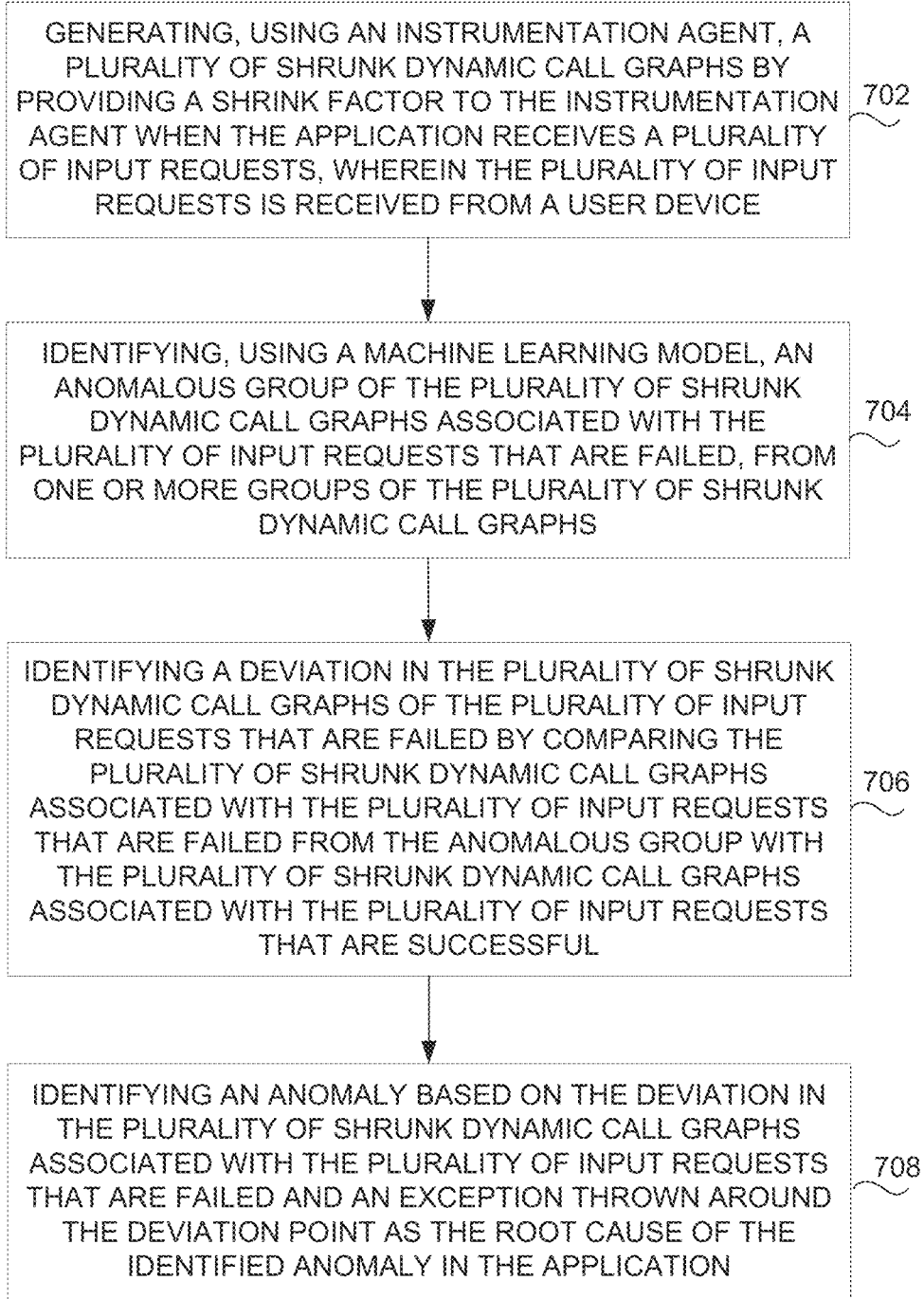
FIG. 7 is a flow diagram that illustrates a method of anomaly detecting and root cause automation according to an embodiment herein.

FIG. 7 is a flow diagram that illustrates a method of anomaly detecting and root cause automation system according to an embodiment herein. At step 702, generating, using an instrumentation agent, a plurality of shrunk dynamic call graphs by providing a shrink factor to the instrumentation agent when the application receives a plurality of input requests, wherein the plurality of input requests is received from a user device. At step 704, identifying, using a machine learning model, an anomalous group of the plurality of shrunk dynamic call graphs associated with the plurality of input requests that are failed, from one or more groups of the plurality of shrunk dynamic call graphs. At step 706, identifying a deviation in the plurality of shrunk dynamic call graphs of the plurality of input requests that are failed by comparing the plurality of shrunk dynamic call graphs associated with the plurality of input requests that are failed from the anomalous group with the plurality of shrunk dynamic call graphs associated with the plurality of input requests that are successful. At step 708, identifying an anomaly based on the deviation in the plurality of shrunk dynamic call graphs associated with the plurality of input requests that are failed and an exception thrown around the deviation point as the root cause of the identified anomaly in the application.

Figure 8:
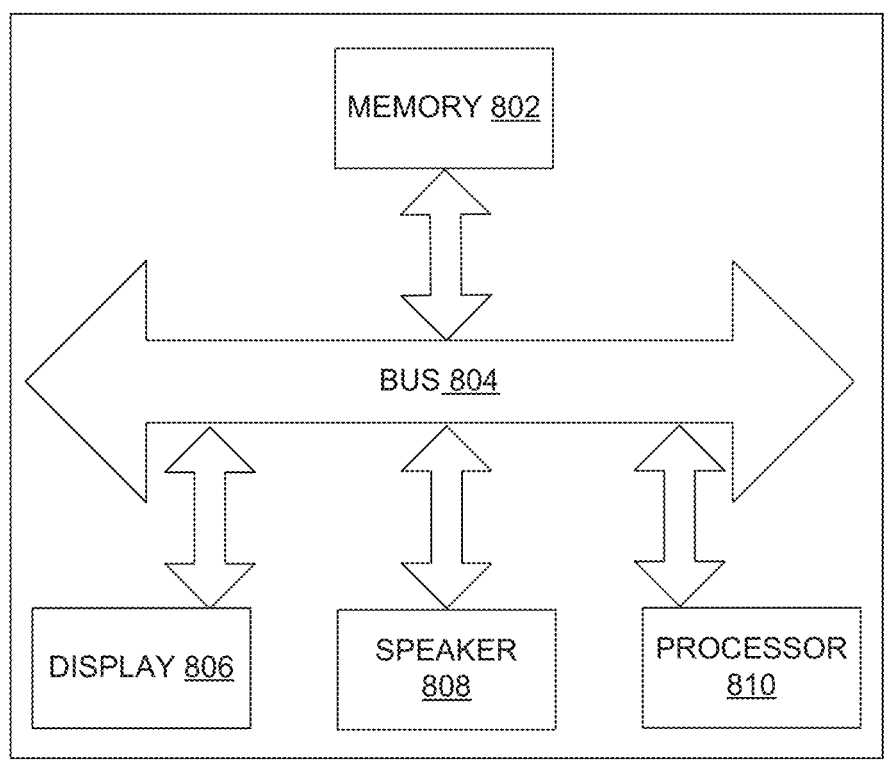
FIG. 8 illustrates an exploded view of a computing device according to an embodiment herein.

FIG. 8 illustrates an exploded view of the computing device (e.g. the user device 104) of FIG. 1 according to the embodiments herein. The computing device having a memory 802 having a set of computer instructions, a bus 804, a display 806, a speaker 808, and a processor 810 capable of processing a set of instructions to perform any one or more of the methodologies herein, according to an embodiment herein. The processor 810 may also enable digital content to be consumed in the form of a video for output via one or more displays 806 or audio for output via speaker and/or earphones 808. The processor 810 may also carry out the methods described herein and in accordance with the embodiments herein.

The embodiments herein can take the form of, an entirely hardware embodiment, an entire software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 9:
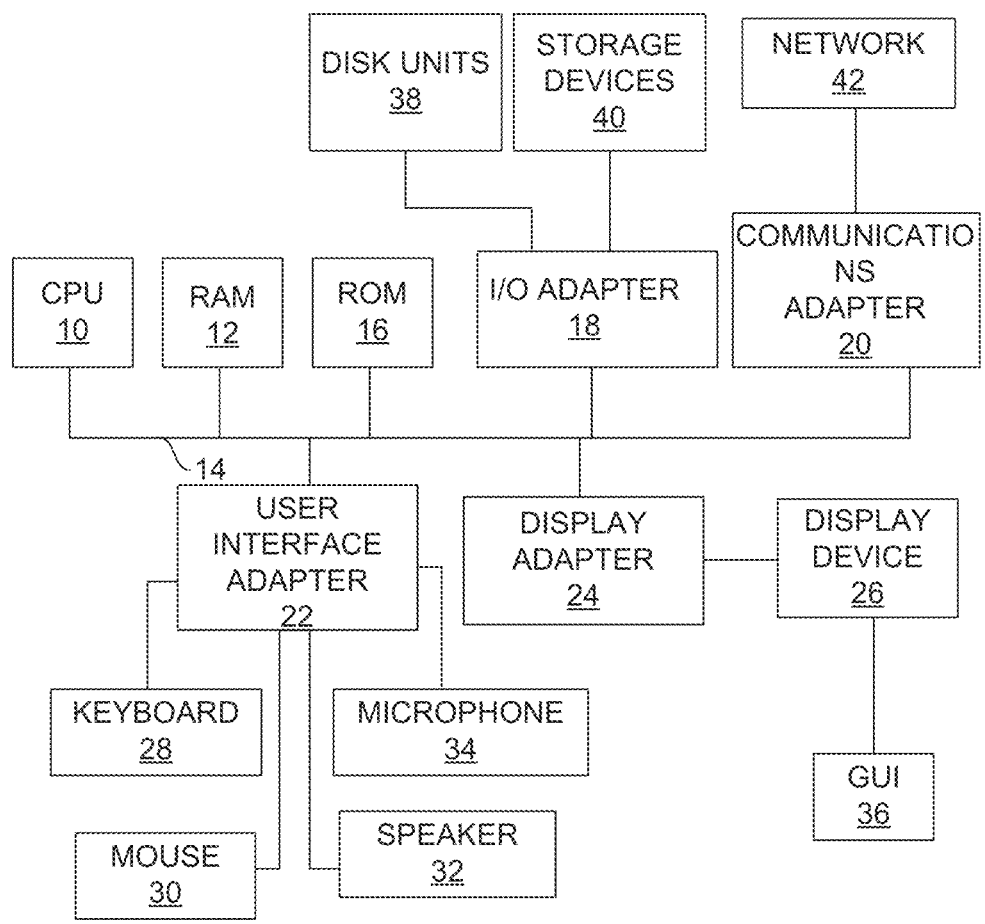
FIG. 9 is a schematic diagram of a computer architecture in accordance with the embodiments herein.

A representative hardware environment for practicing the embodiments herein is depicted in FIG. 9, with reference to FIGS. 1 through 8. This schematic drawing illustrates a hardware configuration of a server/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example. The system and/or method is used for identifying failures and defects in software applications. This helps in reducing huge maintenance costs of Information Technology (IT) organizations. The method provides an automated and real-time or near real-time solution for detecting anomalies and their root cause without manual intervention in programs, web applications, server-side applications, and back-end systems. This method is independent of any programming language.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A processor-implemented method for detecting an anomaly and analyzing a root cause of the anomaly in a real-time monitored application associated with a monitored system using a plurality of shrunk dynamic call graphs, the method comprising:
    receiving, by the real-time monitored application associated with the monitored system, a plurality of input requests from a user input module;
    automatically scanning, by an instrumentation agent, a plurality of lines of code of the real-time monitored application;
    injecting an entry monitoring code and an exit monitoring code to each method associated with each class in the real-time monitored application;
    generating, using the instrumentation agent, a plurality of shrunk dynamic call graphs for a plurality of input requests associated with the real-time monitored application by providing a shrink factor to the instrumentation agent, wherein the shrink factor is provided when the real-time monitored application receives the plurality of input requests, wherein the shrink factor is an amount of detail that is captured for each input request associated with the real-time monitored application;
    storing the plurality of shrunk dynamic call graphs on a storage device;
    transmitting the plurality of shrunk dynamic call graphs to an analysis engine over a network;
    clustering, using an unsupervised machine learning algorithm by the analysis engine, the plurality of shrunk dynamic call graphs in to one or more groups of the plurality of shrunk dynamic call graphs based on an operation type;
    detecting, using a machine learning model associated with the analysis engine, an anomalous group of the plurality of shrunk dynamic call graphs associated with a plurality of failed input requests from the one or more groups of the plurality of shrunk dynamic call graphs;
    comparing, by the analysis engine, the anomalous group of the plurality of shrunk dynamic call graphs associated with the plurality of failed input requests with the plurality of shrunk dynamic call graphs associated with the plurality of successful input requests to identify a deviation point in the plurality of shrunk dynamic call graphs associated with the plurality of failed input requests; and
    detecting, by the analysis engine, an anomaly of the real-time monitored application based on the deviation point in the plurality of shrunk dynamic call graphs associated with the plurality of failed input requests and the exception thrown around the deviation point as the root cause of the identified anomaly in the real-time monitored application.

2. The method of claim 1, wherein detecting the anomalous group of the plurality of shrunk dynamic call graphs comprises (i) obtaining a centroid of a dataset of each input request, (ii) obtaining a plurality of centroids of each of the one or more groups of the plurality of shrunk dynamic call graphs, (iii) obtaining the plurality of centroids based on the exception thrown in each input request, (iv) obtaining, using the plurality of centroids, a farthest centroid from the centroid of the dataset, (iv) identifying, using the farthest centroid, a first anomalous group of the plurality of shrunk dynamic call graphs associated with the plurality of failed input requests, (v) identifying, using the farthest centroid, a second anomalous group based on the exceptions associated with the plurality of failed input requests, and (vi) identifying the anomalous group of the plurality of shrunk dynamic call graphs if the first anomalous group of the plurality of shrunk dynamic call graphs and the second anomalous group based on the exception are same.

3. The method of claim 1, wherein the method comprises creating, using the machine learning model, the one or more groups of the plurality of shrunk dynamic call graphs based on a similarity between the plurality of shrunk dynamic call graphs after removing repeating patterns in the plurality of shrunk dynamic call graphs.

4. The method of claim 3, wherein the one or more groups of the plurality of shrunk dynamic call graphs are created when (i) a distance between two points in each group is lower, and (ii) a minimum number of points are used to form a dense region in each group.

5. The method of claim 1, wherein the plurality of shrunk dynamic call graphs comprises a crest point and a trough point with an absolute height.

6. The method of claim 5, wherein the crest point or the trough point of the plurality of shrunk dynamic call graphs is generated when a difference between two adjacent points is greater than the shrink factor.

7. The method of claim 1, wherein generating the plurality of shrunk dynamic call graphs comprises
    (i) identifying a subroutine in the real-time monitored application that receives and handles the plurality of input requests;
    (ii) inserting probes at each subroutine entry and each subroutine exit in the real-time monitored application;
    (iii) tracking a running height, a running crest, and a running trough of the subroutine being entered;
    (iv) obtaining the crest point in the plurality of shrunk dynamic call graphs by comparing an absolute difference of the running crest, and the running trough to the shrink factor;
    (v) repeating the step (iii) and tracking the running height, the running crest, and the running trough of the subroutine being exited; and
    (vi) obtaining the trough point in the plurality of shrunk dynamic call graphs by comparing an absolute difference of the running crest, and the running trough to the shrink factor.

8. A system for detecting an anomaly and analyzing a root cause of the anomaly in a real-time monitored application associated with a monitored system using a plurality of shrunk dynamic call graphs, comprising:
    a processor; and
    a non-transitory computer-readable storage medium storing one or more sequences of instructions, which when executed by the processor, causes to:
        receive, by the real-time monitored application associated with the monitored system, a plurality of input requests from a user input module;
        automatically scan, by an instrumentation agent, a plurality of lines of code of the real-time monitored application;
        inject an entry monitoring code and an exit monitoring code to each method associated with each class in the real-time monitored application;
        generate, using the instrumentation agent, a plurality of shrunk dynamic call graphs for a plurality of input requests associated with the real-time monitored application by providing a shrink factor to the instrumentation agent, wherein the shrink factor is provided when the real-time monitored application receives the plurality of input requests, wherein the shrink factor is an amount of detail that is captured for each input request associated with the real-time monitored application;

store the plurality of shrunk dynamic call graphs on a storage device;

transmit the plurality of shrunk dynamic call graphs to an analysis engine over a network;

cluster, using an unsupervised machine learning algorithm by the analysis engine, the plurality of shrunk dynamic call graphs in to one or more groups of the plurality of shrunk dynamic call graphs based on an operation type;

detect, using a machine learning model associated with the analysis engine, an anomalous group of the plurality of shrunk dynamic call graphs associated with a plurality of failed input requests from the one or more groups of the plurality of shrunk dynamic call graphs;

compare, by the analysis engine, the anomalous group of the plurality of shrunk dynamic call graphs associated with the plurality of failed input requests with the plurality of shrunk dynamic call graphs associated with the plurality of successful input requests to identify a deviation point in the plurality of shrunk dynamic call graphs associated with the plurality of failed input requests; and detect, by the analysis engine, an anomaly of the real-time monitored application based on the deviation point in the plurality of shrunk dynamic call graphs associated with the plurality of failed input requests and the exception thrown around the deviation point as the root cause of the identified anomaly in the real-time monitored application.

9. The system of claim 8, wherein the processor is configured to detect the anomalous group of the plurality of shrunk dynamic call graphs by (i) obtaining a centroid of a dataset of each input request, (ii) obtaining a plurality of centroids of each of the one or more groups of the plurality of shrunk dynamic call graphs, (iii) obtaining the plurality of centroids based on the exception thrown in each input request, (iv) obtaining, using the plurality of centroids, a farthest centroid from the centroid of the dataset, (iv) identifying, using the farthest centroid, a first anomalous group of the plurality of shrunk dynamic call graphs associated with the plurality of failed input requests, (v) identifying, using the farthest centroid, a second anomalous group based on the exceptions associated with the plurality of failed input requests, and (vi) identifying the anomalous group of the plurality of shrunk dynamic call graphs if the first anomalous group of the plurality of shrunk dynamic call graphs and the second anomalous group based on the exception are same.

10. The system of claim 8, wherein the processor is configured to create using the machine learning model, the one or more groups of the plurality of shrunk dynamic call graphs based on a similarity between the plurality of shrunk dynamic call graphs after removing repeating patterns in the plurality of shrunk dynamic call graphs.

11. The system of claim 8, wherein the processor is configured to create the one or more groups of the plurality of shrunk dynamic call graphs when (i) a distance between two points in the group is lower, and (ii) a minimum number of points to form a dense region in the group are essential while creating the group of the plurality of shrunk dynamic call graphs of a similar plurality of input requests.

12. The system of claim 8, wherein the processor generates the plurality of shrunk dynamic call graphs by:
(i) identifying a subroutine in the real-time monitored application that receives and handles the plurality of input requests;
(ii) inserting probes at each subroutine entry and each subroutine exit in the real-time monitored application;
(iii) tracking a running height, a running crest, and a running trough of the subroutine being entered;
(iv) obtaining the crest point in the plurality of shrunk dynamic call graphs by comparing an absolute difference of the running crest, and the running trough to the shrink factor;
(v) repeating the step (iii) and tracking the running height, the running crest, and the running trough of the subroutine being exited; and
(vi) obtaining the trough point in the plurality of shrunk dynamic call graphs by comparing an absolute difference of the running crest, and the running trough to the shrink factor.

13. A non-transitory computer-readable storage medium storing the one or more sequence of instructions, which when executed by one or more processors, causes to perform a method for detecting an anomaly and analyzing a root cause of the anomaly in a real-time monitored application associated with a monitored system using a plurality of shrunk dynamic call graphs, by performing the steps of:

receiving, by the real-time monitored application associated with the monitored system, a plurality of input requests from a user input module;

automatically scanning, by an instrumentation agent, a plurality of lines of code of the real-time monitored application;

injecting an entry monitoring code and an exit monitoring code to each method associated with each class in the real-time monitored application;

generating, using the instrumentation agent, a plurality of shrunk dynamic call graphs for a plurality of input requests associated with the real-time monitored application by providing a shrink factor to the instrumentation agent, wherein the shrink factor is provided when the real-time monitored application receives the plurality of input requests, wherein the shrink factor is an amount of detail that is captured for each input request associated with the real-time monitored application;

storing the plurality of shrunk dynamic call graphs on a storage device;

transmitting the plurality of shrunk dynamic call graphs to an analysis engine over a network;

clustering, using an unsupervised machine learning algorithm by the analysis engine, the plurality of shrunk dynamic call graphs in to one or more groups of the plurality of shrunk dynamic call graphs based on an operation type;

detecting, using a machine learning model associated with the analysis engine, an anomalous group of the plurality of shrunk dynamic call graphs associated with a plurality of failed input requests from the one or more groups of the plurality of shrunk dynamic call graphs;

comparing, by the analysis engine, the anomalous group of the plurality of shrunk dynamic call graphs associated with the plurality of failed input requests with the plurality of shrunk dynamic call graphs associated with the plurality of successful input requests to identify a deviation point in the plurality of shrunk dynamic call graphs associated with the plurality of failed input requests; and detecting, by the analysis engine, an anomaly of the real-time monitored application based on the deviation point in the plurality of shrunk dynamic call graphs associated with the plurality of failed input requests and the exception thrown around the deviation point as the root cause of the identified anomaly in the real-time monitored application.

14. The non-transitory computer-readable storage medium storing the one or more sequence of instructions of claim 13, wherein detecting the anomalous group of the plurality of shrunk dynamic call graphs comprises (i) obtaining a centroid of a dataset of each input request, (ii) obtaining a plurality of centroids of each of the one or more groups of the plurality of shrunk dynamic call graphs, (iii) obtaining the plurality of centroids based on the exception thrown in each input request, (iv) obtaining, using the plurality of centroids, a farthest centroid from the centroid of the dataset, (iv) identifying, using the farthest centroid, a first anomalous group of the plurality of shrunk dynamic call graphs associated with the plurality of failed input requests, (v) identifying, using the farthest centroid, a second anomalous group based on the exceptions associated with the plurality of failed input requests, and (vi) identifying the anomalous group of the plurality of shrunk dynamic call graphs if the first anomalous group of the plurality of shrunk dynamic call graphs and the second anomalous group based on the exception are same.

15. The non-transitory computer-readable storage medium storing the one or more sequence of instructions of claim 13, wherein the method further includes creating, using the machine learning model, the one or more groups of the plurality of shrunk dynamic call graphs based on a similarity between the plurality of shrunk dynamic call graphs after removing repeating patterns in the plurality of shrunk dynamic call graphs.

16. The non-transitory computer-readable storage medium storing the one or more sequence of instructions of claim 13, wherein generating the plurality of shrunk dynamic call graphs comprises,
 (i) identifying a subroutine in the real-time monitored application that receives and handles the plurality of input requests;
 (ii) inserting probes at each subroutine entry and each subroutine exit in the real-time monitored application;
 (iii) tracking a running height, a running crest, and a running trough of the subroutine being entered;
 (iv) obtaining the crest point in the plurality of shrunk dynamic call graphs by comparing an absolute difference of the running crest, and the running trough to the shrink factor;
 (v) repeating the step (iii) and tracking the running height, the running crest, and the running trough of the subroutine being exited; and
 (vi) obtaining the trough point in the plurality of shrunk dynamic call graphs by comparing an absolute difference of the running crest, and the running trough to the shrink factor.

* * * * *